Figure 1:
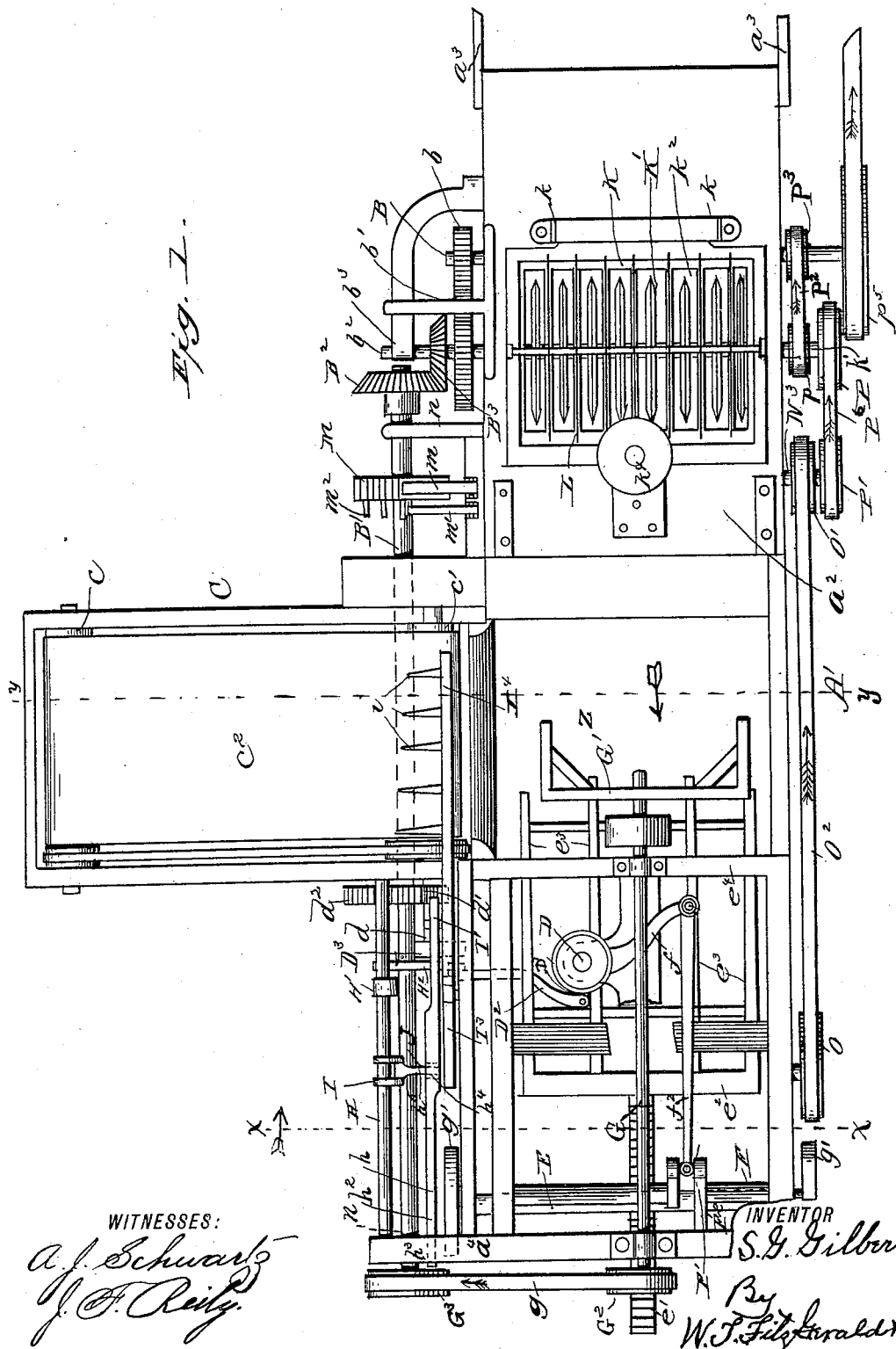

(No Model.) 6 Sheets—Sheet 1.

S. G. GILBERT.
FEEDER AND SPREADER FOR THRASHING MACHINES.

No. 470,932. Patented Mar. 15, 1892.

(No Model.) 6 Sheets—Sheet 2.
S. G. GILBERT.
FEEDER AND SPREADER FOR THRASHING MACHINES.
No. 470,932. Patented Mar. 15, 1892.

WITNESSES:
A. J. Schwartz
J. F. Reily

S. G. Gilbert  *Inventor*
BY
W. F. Fitzgerald & Co.,
ATTORNEYS.

THE NORRIS PETERS CO., PHOTO-LITHO., WASHINGTON, D. C.

(No Model.) 6 Sheets—Sheet 3.
S. G. GILBERT.
FEEDER AND SPREADER FOR THRASHING MACHINES.
No. 470,932. Patented Mar. 15, 1892.

WITNESSES:

INVENTOR
S. G. Gilbert
BY
W. T. Fitzgerald & Co.
ATTORNEYS.

(No Model.) 6 Sheets—Sheet 4.
S. G. GILBERT.
FEEDER AND SPREADER FOR THRASHING MACHINES.
No. 470,932. Patented Mar. 15, 1892.
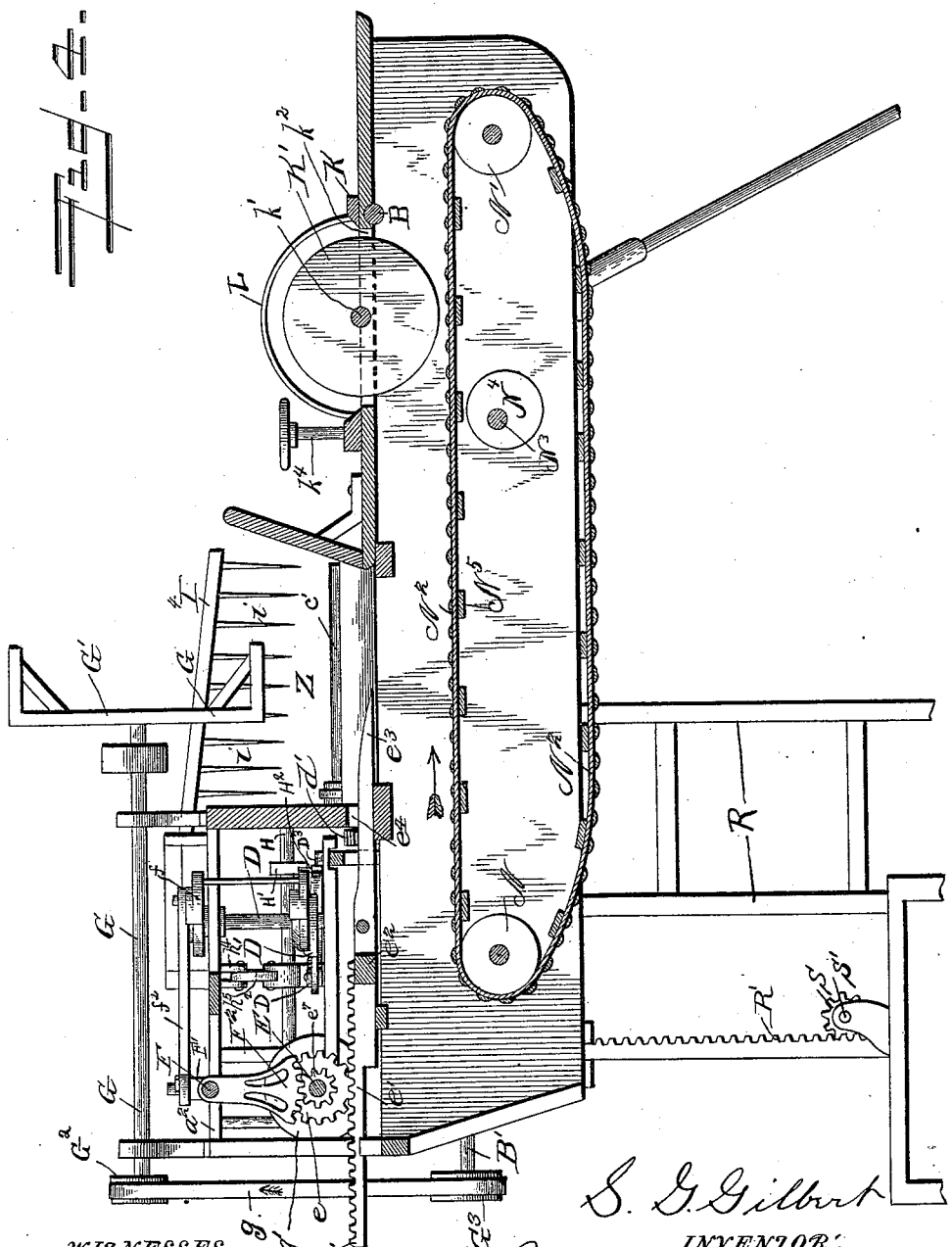

(No Model.) 6 Sheets—Sheet 5.
S. G. GILBERT.
FEEDER AND SPREADER FOR THRASHING MACHINES.
No. 470,932. Patented Mar. 15, 1892.
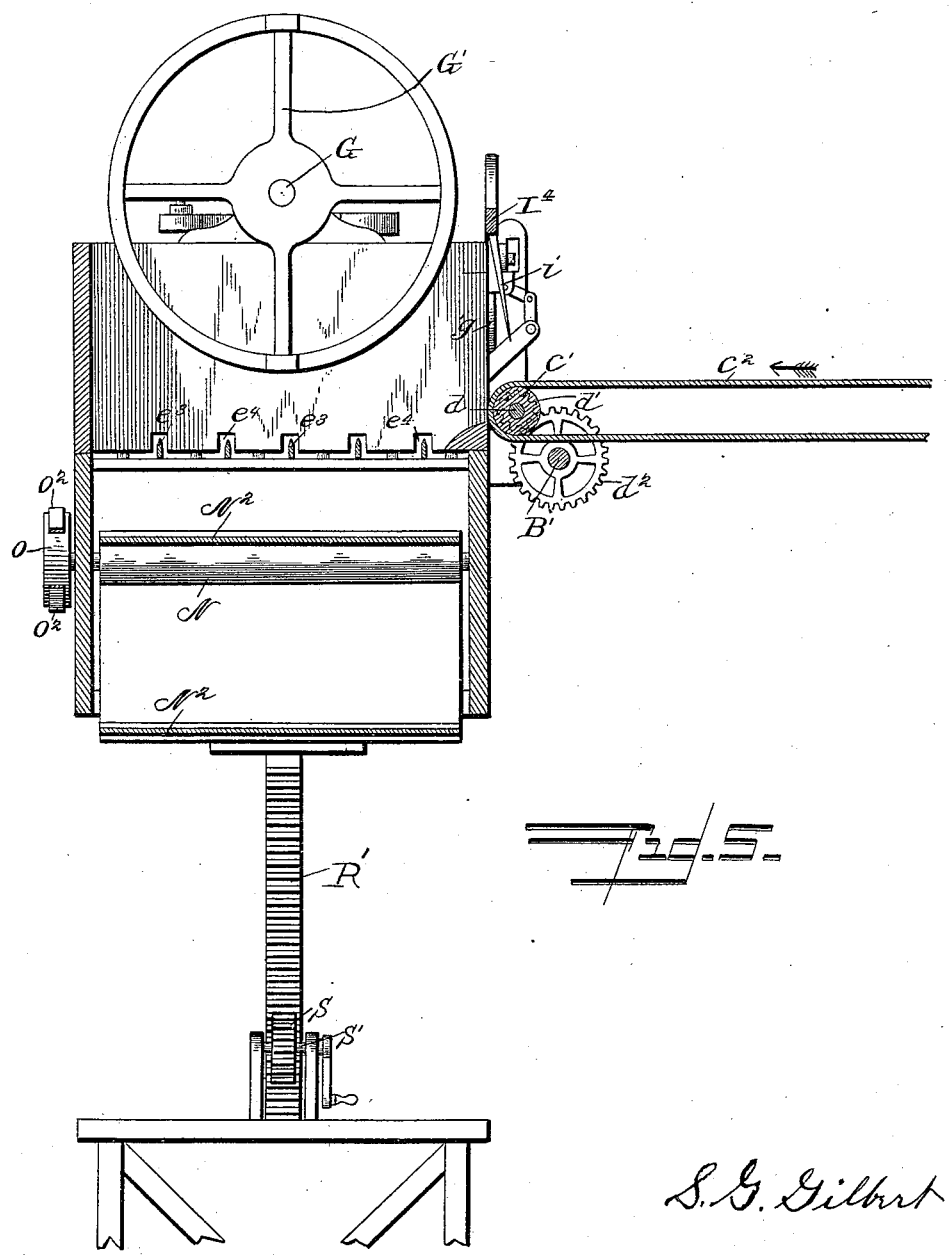

(No Model.) 6 Sheets—Sheet 6.
S. G. GILBERT.
FEEDER AND SPREADER FOR THRASHING MACHINES.
No. 470,932. Patented Mar. 15, 1892.
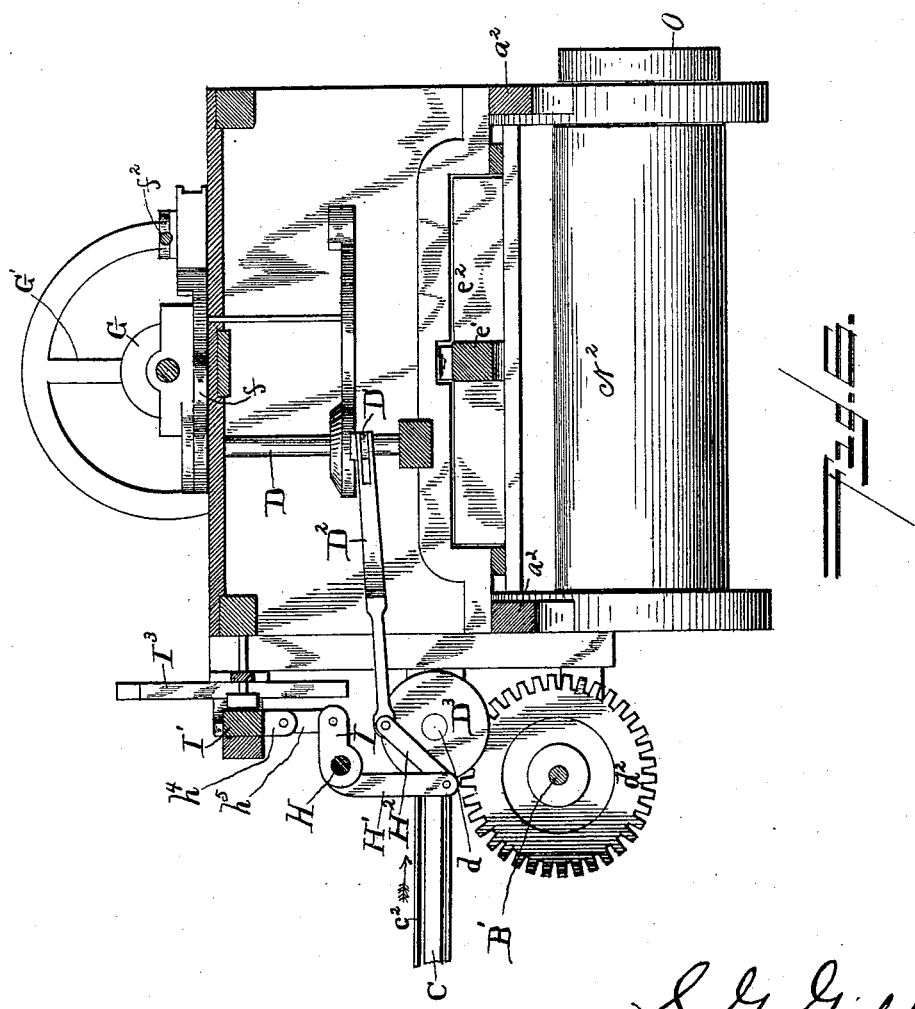
Witnesses
C. S. Frye
Thomas E. Turpin
S. G. Gilbert,
Inventor.
By W. G. Fitzgerald & Co.,
Attorneys.

UNITED STATES PATENT OFFICE.

SILVANUS GARLEN GILBERT, OF ORLINDA, TENNESSEE.

FEEDER AND SPREADER FOR THRASHING-MACHINES.

SPECIFICATION forming part of Letters Patent No. 470,932, dated March 15, 1892.

Application filed March 13, 1891. Serial No. 384,931. (No model.)

*To all whom it may concern:*

Be it known that I, SILVANUS GARLEN GILBERT, a citizen of the United States, residing at Orlinda, in the county of Robertson and State of Tennessee, have invented certain new and useful Improvements in Band-Cutters and Spreaders for Thrashing-Machines; and I do hereby declare the following to be a full, clear, and exact description of the invention, such as will enable others skilled in the art to which it appertains to make and use the same.

My invention has relation to a combined band-cutter and spreader for thrashing-machines; and it consists in the construction and novel arrangement of parts, as hereinafter more fully described and claimed.

The object of my invention is to provide a machine that will readily cut the bands or bundles of grain and for spreading the straw equally over an endless carrier-apron preparatory to being fed into the thrashing-cylinder; further, to provide a suitable cut-off device whereby the bundles are permitted to be fed regularly to the band-cutting knives; further, to so hinge the band-cutting and spreading mechanism to the thrashing-machine that the said part may be readily folded over upon the thrashing-machine by ropes leading from a windlass on the thrashing-machine to suitable points on the frame of the band-cutting section when not in use, and, further, to provide a supplemental carrier placed at right angles to the thrashing-machine and so arranged as to discharge upon an automatic sliding grate and be held above the carrier-apron until the grating is drawn forward, when the bundle will be allowed to drop on said apron and be carried to the cutting-knives.

Figure 2:
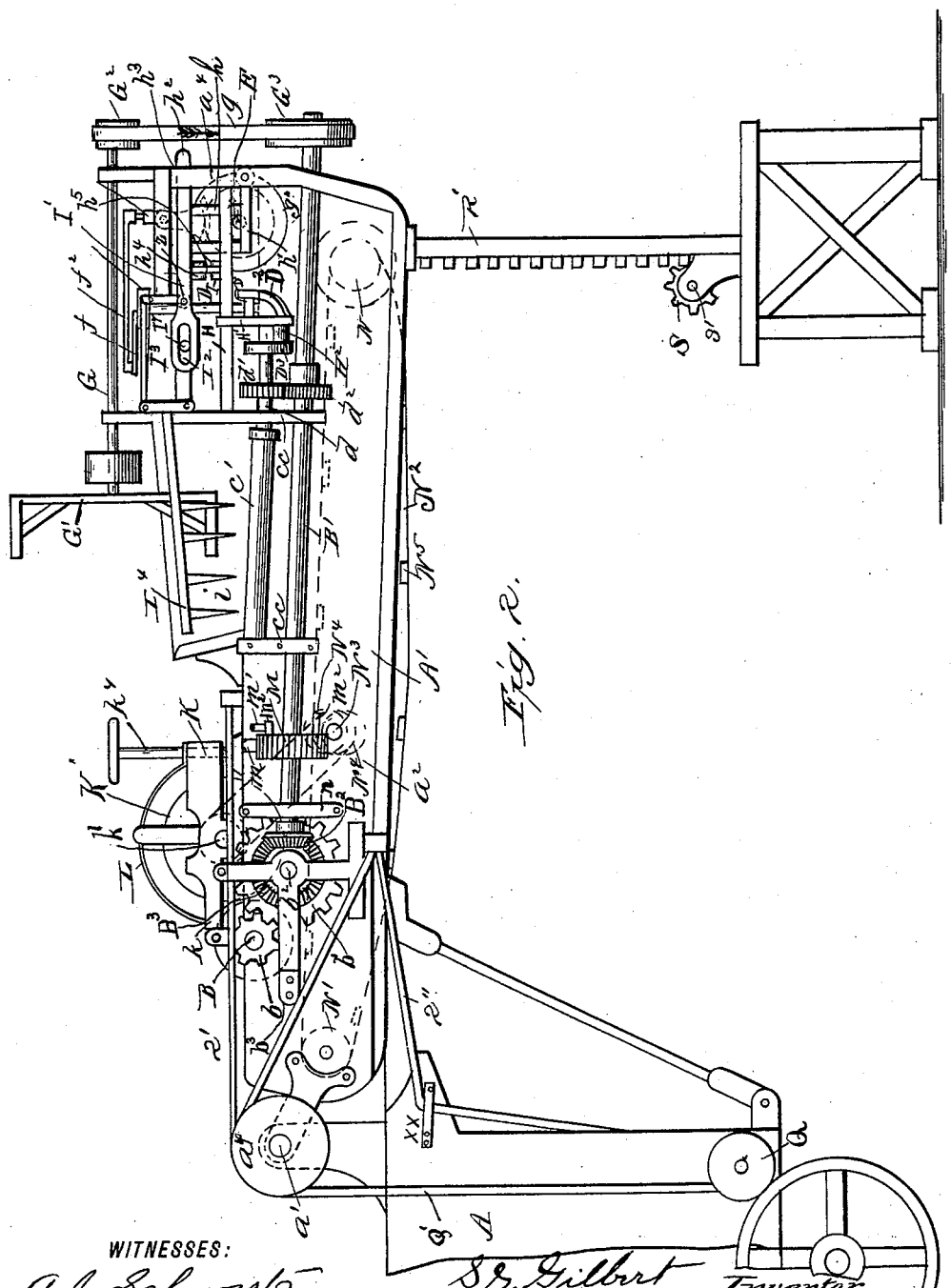
Figure 3:
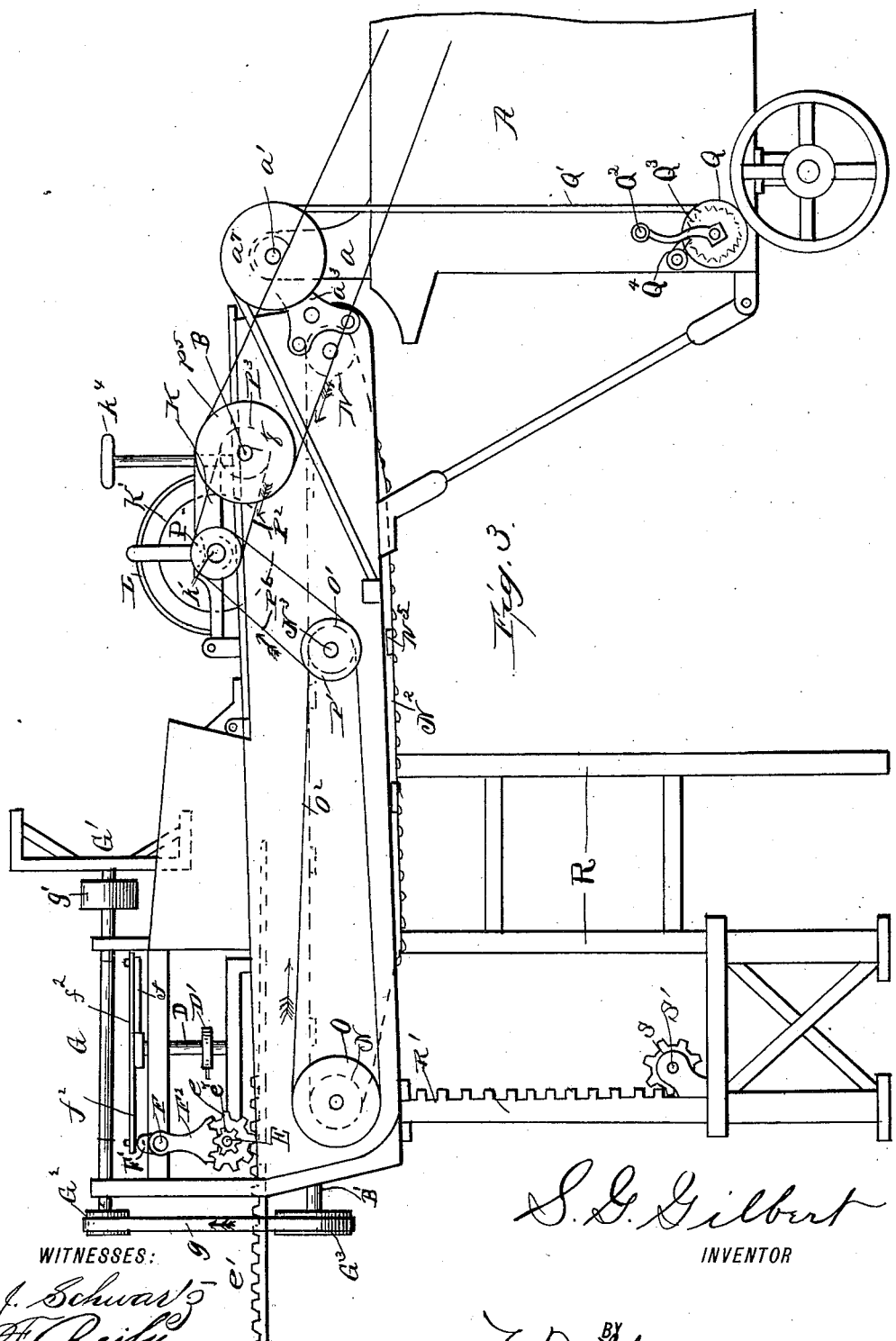

In the drawings, Figure 1 is a plan view of a band-cutter and spreader embodying my invention, the same being attached to so much of a thrashing-machine as will suffice to illustrate the application of my invention. Fig. 2 is a side elevation of the same with the supplemental carrier removed. Fig. 3 is a side elevation looking from the side opposite to that shown in Fig. 2. Fig. 4 is a longitudinal vertical section of the band-cutter and feeder. Fig. 5 is an enlarged vertical transverse section taken in the plane indicated by the line $y\ y$ on Fig. 1, looking in the direction of the arrow; and Fig. 6 is a similar view taken in the plane indicated by the line $x\ x$, looking in the direction indicated by the arrow on said line.

Referring to the drawings, in which like letters of reference indicate corresponding parts in all the figures, A designates a thrashing-machine of the usual construction and has secured to it at its front end at opposite sides brackets $a$, in which are journaled a transverse shaft $a'$.

A' designates the band-cutting and feeding device, the frame $a^2$ of which is of a general rectangular form and provided at its inner end with arms $a^3$, which arms are pivotally mounted on the shaft $a'$, whereby the said frame $a^2$ may be readily folded over upon the top of the thrashing-machine when not in use.

The drive-shaft B is journaled in suitable bearings formed in the sides of the frame $a^2$ near its inner end and carries at one end a pinion $b$, meshing with a gear-wheel $b'$, mounted upon a short shaft $b^2$, journaled in bearings in the side of the frame $a^2$, and an arm $b^3$, secured to the side of the main frame.

B' is a longitudinal shaft journaled in brackets $n$, attached to the side of the main frame at suitable points thereon and runs parallel therewith, carrying at its inner end a bevel-gear $B^2$, which meshes with a like wheel $B^3$ on the shaft $b^2$.

C designates a supplemental carrier-frame of general rectangular form, and is pivoted at its inner end to suitable arms extending from the frame $a^2$.

$c$ is a roller journaled in suitable bearings in the outer end of the carrier-frame C, while the roller $c'$ is similarly journaled to the side of the frame $a^2$ at the mouth of the carrier, and over these rollers travels the endless belt $c^2$ for carrying the bundles to the carrier-apron $N^2$, presently described. On the extended portion $d$ of the shaft which carries the roller $c'$ is secured a gear-wheel $d'$, which meshes with a like wheel $d^2$, carried by the shaft B', through the medium of which the belt $c^2$ is moved.

Journaled in suitable bearings in the frame $a^2$ is a transversely-disposed rock-shaft E, upon the middle of which is fixedly mounted a gear-wheel $e$, which meshes with a longitudinally-disposed and movable rack-bar $e'$, which is connected at its forward end to the cross-bar $e^2$ of a slat-frame, the forwardly-extending slats $e^3$ of which take through apertures $e^4$ in the rear transverse wall of the hopper Z, and are designed to be moved forward and backward through the medium of mechanism presently described to close and open the bottom of the said hopper and drop the bundles intermittingly upon the carrier-apron $N^2$, whereby the objectionable clogging will be obviated. Journaled in suitable bearings above the shaft E is another transverse rock-shaft F, to which is fixedly connected a gear-segment $F^2$, which meshes with a fixed pinion $e^7$ upon the shaft E, through the medium of which the said shaft E is rocked and the slat dropper-frame moved alternately forward and backward for the purpose described.

The rock-shaft F, which is provided at a suitable point in its length with a crank $F'$, is rocked through the medium of the following-described mechanism.

Journaled at a suitable point in the main frame is a vertically-disposed rock-shaft D, which is provided at its upper end with a lateral arm $f$, to the outer end of which is pivotally connected one end of a pitman $f^2$, which is flexibly connected at its opposite end to the crank $F'$ of the shaft F.

Flexibly connected to a laterally-extending arm $D'$, connected to the vertical shaft D, is a pitman $D^2$, which is pivotally connected at its opposite end to a wrist-pin extending from the face of a disk $D^3$ off the center thereof. The disk $D^3$, as better illustrated in Fig. 2 of the drawings, is fixedly mounted on one end of the shaft $d$, before described, from which motion is transmitted to the reciprocating slat-frame through the medium of the mechanism described.

Journaled in bearings formed on the upper face of the frame $a^2$ above the vertical shaft D is a longitudinal shaft G, which carries at its inner end radial arms or rakes $G'$, the object of which is to form a rake whereby the bundles of grain may be distributed evenly over the carrier-apron. At the outer end of the shaft G is a pulley $G^2$, over which and the pulley $G^3$ on the end of the shaft $B'$ passes an endless belt $g$. At each end of the shaft E are preferably mounted balance-wheels $g'$.

In order that the bundles of grain may be fed one at a time to the endless carrier-apron, I prefer to employ the following means: A longitudinally-disposed rock-shaft H is journaled in bearings in an extension $a^4$ on the main frame $a^2$ and carries near its middle an arm $H'$, which has pivoted in its lower end the end of a connecting-link $H^2$, the opposite end of which is pivoted on the wrist-pin carried by the crank-disk $D^3$, from which the rock-shaft H is rocked.

$h$ designates a rectangular frame the lower arm $h'$ of which is pivoted in a vertical slot formed in the extension on the main frame, the upper arm $h^2$ working freely in the slot $h^3$ on the frame. At a suitable point on the frame $h$ are formed perforated lugs $h^4$, between which is pivoted a link $h^5$, the opposite end of which is pivoted between perforated lugs I on the rock-shaft H.

$I'$ designates an arm extending laterally from the rectangular frame $h$, and is provided in its outer end with an elongated slot $I^2$, for a purpose hereinafter set forth.

Loosely pivoted to the side of the frame $a^2$, at the point indicated by Z, is a rectangular frame $I^3$, provided with an extended arm $I^4$, having dependent from it at an angle a series of fingers $i$. Extending laterally from the lower longitudinal bar of the frame $I^3$ is a stud $I^7$, which is engaged by the slot $I^2$ of the arm $I'$ of the frame $h$, whereby it will be seen that when the said frame $h$ is raised and lowered by the motion of the rock-shaft H, as presently described, the forward end of the frame $I^3$ and the extending arm $I^4$ will also be raised and lowered.

The letter $h^5$ designates a link, one end of which is pivoted between lugs I on the rock-shaft H, its opposite end pivoted between lugs $h^4$ dependent from the arm I, the object of which is to raise and lower the fingers $i$, whereby the bundles of grain are fed intermittingly upon the longitudinally-moving grating to be dropped automatically upon the carrier-apron.

By reason of the reciprocating slat-frame and the rock-shaft H being actuated from the disk $D^3$ it will be readily perceived that when the slat-frame is drawn rearwardly and the bottom of the hopper Z is open the arm $I^4$ and the fingers $i$ will be in their lower positions and will prevent the bundles from being discharged through the hopper and directly upon the apron $N^2$; but when the slat-frame is moved forwardly to close the bottom of the hopper the arm $I^4$ and its fingers will be raised and the bundles will be released and fall upon said slat-frame, which discharges them in turn upon the apron $N^2$.

Having thus fully described the feeding mechanism, I will now proceed to describe the band-cutting mechanism and the means employed for operating the same.

The letter K designates a rectangular frame pivoted at one end to perforated lugs $k$, rising from the frame $a^2$, and is provided upon opposite sides with bearings, in which is journaled a shaft $k'$, carrying a series of circular cutting-knives $K'$, their lower edges working in longitudinal slots $k^2$, formed in the upper face of the frame $a^2$.

L indicates a guard or shield formed over the knives and supported by the rectangular frame K, and in order that said frame, as well as the knives carried thereby, may be vertically adjusted to accommodate bundles of different sizes, as well as to allow the knives to be removed from the slots in order to be cleaned, I provide the frame K upon one end with a screw-threaded opening, in which fits and works a set-screw $k^4$, the lower end of which rests in a cup-shaped bearing formed on the upper face of the frame $a^2$.

M indicates a ratchet-wheel, which is fixed upon the longitudinal shaft B' and is designed to be engaged by a gravitating pawl $m$, pivotally connected to the side of the main frame. Extending laterally from one side of the ratchet-wheel M are pins $m^2$, which are arranged at intermediate points with respect to the ratchet-teeth and are designed to be engaged by a gravitating pawl $m'$, which is pivotally connected to the side of the main frame and is designed to prevent a slight backward rotation of the wheel M while the pawl $m$ is riding from one tooth to another thereof. The pawl $m$ serves, in conjunction with the ratchet-wheel M, to prevent a backward rotation of the shaft B' and an incidental injury to the feeding mechanism, which is driven from said shaft, as before described.

The letters N N' designate rollers journaled in suitable bearings at each end of the frame $a^2$, over which passes the endless carrier-apron $N^2$, and in order that the grain may be distributed equally over the apron when the bands have been cut I journal in suitable bearings below the knives K' and the upper part of the carrier-apron a shaft $N^3$, carrying three or more eccentrics $N^4$, adapted to strike against the strips $N^5$ on the carrier-apron and agitate the bundles of grain, so that they will be distributed or spread equally over the carrier-apron preparatory to the cutting of the bands.

Fixedly mounted upon the end of the drive-shaft B is a pulley $p^5$, around which passes the main driving-belt, which leads from a pulley on the drive-shaft of the thrashing-machine or from any suitable motor; also, fixedly mounted on the drive-shaft B is a pulley $P^3$, around which takes a belt $P^2$, which also takes around a pulley $p$, fixed on the shaft $k'$, and through the medium of which said shaft and knives K' are rotated. Fixed on the shaft $k'$ is another pulley P, around which and a pulley P' on the shaft $N^3$ takes a belt $P^6$, through the medium of which the said shaft $N^3$ is rotated. Fixed on the shaft $N^3$ is another pulley O', around which and a pulley O, fixed on the shaft of the apron-roller N, takes a belt $O^2$, which serves to transmit motion to said roller and to the endless apron $N^2$.

From the foregoing description it will be seen that the bundle-feeding and the band-cutting mechanisms are driven from a common drive-shaft.

Journaled in suitable bearings formed in the front end of the thrashing-machine A, near the bottom thereof, is a transverse rotatable windlass Q, to which are connected the ends of ropes Q', which take over suitable friction-pulleys, as $a^7$, and through suitable guide-eyes, and have their ends connected to the sides of the frame $a^2$, whereby it will be seen that when the windlass is rotated in the direction of the arrow the frame $a^2$ may be raised, and when desired may be folded over upon the thrashing-machine. Fixedly connected to the end of the windlass Q is a crank $Q^2$, whereby said windlass may be readily rotated, and fixedly mounted upon the shaft of the windlass is a ratchet-wheel $Q^3$, designed to be engaged by a gravitating pawl $Q^4$, pivotally connected to one side of the thrashing-machine A, which pawl serves to prevent casual backward rotation of the windlass.

The front end of the frame $a^2$ is normally supported by the standards R, as illustrated, the lower ends of which standards may rest upon the ground or upon any suitable base.

Connected to and depending from the bottom of the frame $a^2$, adjacent to the front end thereof, is a rack-bar R', which is engaged by a pinion S, fixedly mounted upon a shaft S', which is journaled in suitable bearings upon a suitable support, and is provided at one end with a crank or the like, whereby it may be readily rotated and the front end of the frame elevated irrespective of the windlass Q and the ropes Q', before described.

In the operation of my improved machine the bundles are placed transversely upon the endless carrier, from whence they are discharged intermittently upon the longitudinally-movable slat-frame, which discharges them intermittently upon the endless apron $N^2$, by which they are carried beneath the knives, where the bands are cut.

By the construction described it will be readily perceived that the bundle will be fed freely and evenly to the band-cutting knives, and will be prevented from choking said knives and accumulating upon and straining the carrier-apron.

Having thus described my invention, what I claim, and desire to secure by Letters Patent, is—

1. In a band-cutter and feeder, substantially as described, the combination, with the main frame and the endless carrier-apron, of the rectangular frame K, having one of its sides flexibly connected to the main frame, the guards carried by the frame K, the set-screws $k^4$, taking through the free side of the rectangular frame and bearing upon the upper side of the main frame, a rotatory shaft journaled in the end bars of the rectangular frame, and circular knives fixedly mounted on the said shaft, substantially as specified.

2. In a band-cutter and feeder, the combination, with the frame $a^2$, the hopper, and the supplemental carrier arranged at right angles to the frame and leading to the hopper, of a vertically-movable cut-off arranged at the inner end of the supplemental carrier, a longitudinally-sliding slat-frame mounted in the main frame and having a series of slats or fingers adapted to extend across the bottom of the hopper, and a suitable means, substantially as described, for actuating the cut-off and the slat-frame, substantially as specified.

3. In a band-cutter and feeder, the combination, with the frame $a^2$, the feed-hopper arranged therein, and the carrier-apron traveling beneath the bottom of the hopper, of a longitudinally-sliding slat-frame mounted in the main frame and having a series of slats or fingers adapted to extend across the bottom of the hopper, and a suitable means, substantially as described, for longitudinally reciprocating with the slat-frame, substantially as set forth.

4. In a band-cutter and feeder, the combination, with the frame $a^2$, the endless apron, the hopper, and a supplemental carrier extending at right angles to said frame and leading to the hopper, of an automatic cut-off working across the inner end of the supplemental carrier, the longitudinally-movable slat-frame, the revolving rake above the slat-frame, and means, substantially as described, for actuating the cut-off, rake, and the slat-frame, substantially as specified.

5. In a band-cutter and feeder, substantially as described, the combination, with the frame $a^2$, the hopper, and the endless carrier-apron traveling beneath the hopper, of the longitudinally-movable slat-frame arranged between the hopper and the endless apron and having a rearwardly-extending rack-bar, a transverse rock-shaft journaled in the frame $a^2$ above the rack-bar of the slat-frame and carrying a gear-wheel meshing with the said rack-bar, and a suitable means, substantially as described, for rocking the rock-shaft, substantially as set forth.

6. The combination, with the frame $a^2$, of the shaft carrying a crank-disk, the cut-off pivoted on the side of the frame $a^2$, a rock-shaft arranged between the crank-disk and the cut-off and connected with the crank-disk by a link, and the arm connected to the cut-off and operated by the rock-shaft, as set forth.

In testimony whereof I affix my signature in presence of two witnesses.

SILVANUS GARLEN GILBERT.

Witnesses:
WM. C. BROWN,
CHAS. A. AXTER.